US008384954B2

(12) United States Patent
Honma

(10) Patent No.: US 8,384,954 B2
(45) Date of Patent: Feb. 26, 2013

(54) IMAGE PROCESSING APPARATUS, METHOD AND COMPUTER-READABLE MEDIUM FOR CONVERTING MONOCHROME IMAGE INTO COLOR IMAGE WITH THE DETERMINATION OF PIXEL ATTRIBUTES AND SELECTED COLORIZATION METHODS

(75) Inventor: Toshiki Honma, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 237 days.

(21) Appl. No.: 12/883,908

(22) Filed: Sep. 16, 2010

(65) Prior Publication Data

US 2011/0069331 A1    Mar. 24, 2011

(30) Foreign Application Priority Data

Sep. 18, 2009    (JP) ................................. 2009-216503

(51) Int. Cl.
  *G06K 1/00* (2006.01)
  *G06F 17/00* (2006.01)
  *G09G 5/02* (2006.01)

(52) U.S. Cl. .......... 358/1.9; 358/2.1; 358/505; 358/448; 358/474; 382/167; 382/176; 382/274; 715/223; 345/600

(58) Field of Classification Search ........................ None
See application file for complete search history.

(56) References Cited

U.S. PATENT DOCUMENTS

| 5,751,921 | A |   | 5/1998 | Fujimoto |  |
| 5,918,238 | A | * | 6/1999 | Hayashi | ........................ 715/223 |
| 6,067,555 | A | * | 5/2000 | Hayashi | ........................ 715/234 |
| 6,600,832 | B1 | * | 7/2003 | Nakayama et al. | ........... 382/162 |
| 6,760,125 | B1 | * | 7/2004 | Hayama | ........................ 358/1.9 |

(Continued)

FOREIGN PATENT DOCUMENTS

| JP | 7-121733 | 5/1995 |
| JP | 10-149441 | 6/1998 |

(Continued)

OTHER PUBLICATIONS

Decision to Grant a Patent dated Sep. 6, 2011 for corresponding Japanese patent application No. 2009-216503 and its English translation; 8 pgs.

(Continued)

*Primary Examiner* — Steven Kau
(74) *Attorney, Agent, or Firm* — Morrison & Foerster LLP

(57) ABSTRACT

An apparatus for converting a monochrome image into a color image includes a selection portion that select, for a plurality of attributes, individual colorization methods from among a plurality of colorization methods that are defined individually such that the plurality of colorization methods correspond to at least one attribute among the plurality of attributes relating to the plurality of regions, a processing portion that colorizes the monochrome image to produce a colorized image by applying the individual colorization methods selected by the selection portion, and a determination portion that determines whether or not the colorized image satisfies a setting condition. In this apparatus, when the determination portion determines that the setting condition is not satisfied, the selection portion changes a combination of the colorization methods such that at least one among the plurality of colorization methods applied to the plurality of regions is changed. The processing portion performs re-colorization on a region having an attribute for which the selection of the colorization method is changed among colorization methods included in the combination.

10 Claims, 10 Drawing Sheets

U.S. PATENT DOCUMENTS

| | | | |
|---|---|---|---|
| 6,774,909 B1 * | 8/2004 | Nishio | 345/600 |
| 6,985,255 B2 * | 1/2006 | Saito | 358/1.9 |
| 7,292,370 B2 * | 11/2007 | Iwaki | 358/1.9 |
| 7,755,795 B2 * | 7/2010 | Shimada | 358/1.9 |
| 2002/0022971 A1 * | 2/2002 | Tanaka et al. | 705/1 |
| 2002/0054329 A1 * | 5/2002 | Hiraoka | 358/1.15 |
| 2002/0060798 A1 * | 5/2002 | Shimada | 358/1.9 |
| 2003/0030825 A1 * | 2/2003 | Kubo et al. | 358/1.9 |
| 2004/0257621 A1 * | 12/2004 | Ishihara | 358/2.1 |

FOREIGN PATENT DOCUMENTS

| | | | |
|---|---|---|---|
| JP | 10149441 | * | 6/1998 |
| JP | 10-324025 | | 12/1998 |
| JP | 2005-51510 | | 2/2005 |
| JP | 2005-323258 | | 11/2005 |
| JP | 2005323258 | * | 11/2005 |
| JP | 2006-350407 | | 12/2006 |
| JP | 2006350407 | * | 12/2006 |

OTHER PUBLICATIONS

Japanese Notification of Reason(s) for Refusal mailed Jun. 21, 2011, directed towards Japanese Patent Application No. 2009-216503; 6 pages.

Automatic Coloring Software "Haikara," dated Aug. 12, 2009, Recursion Co., Ltd. Profile updated Nov. 20, 2009; located at http://www.recursion.jp/mitou15 visited on Aug. 12, 2009 (5 pages).

* cited by examiner

FIG. 3

| COLORIZATION METHODS | | | | | | |
|---|---|---|---|---|---|---|
| | TEXT | | GRAPHIC | | | PHOTOGRAPH |
| | A | B | A | B | C | D |
| 1ST METHOD | YES | | | | YES | YES |
| 2ND METHOD | YES | | YES | | | YES |
| 3RD METHOD | YES | | | YES | | YES |
| 4TH METHOD | | YES | | | YES | YES |
| 5TH METHOD | | YES | YES | | | YES |
| 6TH METHOD | | YES | | YES | | YES |

COLORIZATION METHODS

A: COLORIZE ACCORDING TO DENSITY (RED ASSIGNED TO MEDIUM DENSITY)
B: COLORIZE ACCORDING TO DENSITY (GREEN ASSIGNED TO MEDIUM DENSITY)
C: ASSIGN DIFFERENT COLORS TO ADJACENT PORTIONS
D: SEARCH FOR SIMILAR COLOR IMAGE AND COLORIZE TO THE SEMBLANCE THEREOF

G11
GRAY SCALE IMAGE

G31
COLOR IMAGE BY 1ST COMBINATION

G32
COLOR IMAGE BY 4TH COMBINATION

IMAGE PROCESSING APPARATUS, METHOD AND COMPUTER-READABLE MEDIUM FOR CONVERTING MONOCHROME IMAGE INTO COLOR IMAGE WITH THE DETERMINATION OF PIXEL ATTRIBUTES AND SELECTED COLORIZATION METHODS

This application is based on Japanese Patent Application No. 2009-216503 filed on Sep. 18, 2009, the contents of which are hereby incorporated by reference.

BACKGROUND OF THE INVENTION

1. Field of the Invention

The present invention relates to an image processing apparatus, image processing method, and a computer-readable storage medium for computer program for converting a color image into a monochrome image.

2. Description of the Related Art

Color documents are often printed in monochrome. Such instances, more often than not, involve a case where an available printer is a monochrome printer or a case where a monochrome printing mode is selected in a color printer to reduce a printing cost. In the monochrome printing, although colors of the document are not reproduced, a grey scale image having shades of gray according to the original colors can be printed. This makes it possible to distinguish, in a certain degree, differences in the original colors from the finished print.

On one hand, color document is printed in monochrome in this way. On the other hand, there are demands for colorization of the monochrome document. Among the purposes of colorization are improving the appearance of the document and improving legibility of the information. The colorization enhances legibility of the document information since a color image includes not only the information of lightness but also hue and saturation. For example, in a case where a document available at hand is a monochrome document converted from original colors, the monochrome document may have portions whose identification from one another is made difficult by the monochromatic conversion because two distinct original colors have been converted into densities (lightness) extremely close to each other. In such a case, colorization makes it possible to colorize again, using colors but may be different from the original, the portions used to be separated by different colors. As a result, such portions can be easily identified from one another.

There are following related arts that are known to propose colorization methods. JP-H10-324025A proposes a method for allocating predetermined colors to individual pixels of a monochrome image according to the density of the pixel. JP-2005-051510A proposes a method for colorizing each region of graphic or text so that the individual neighboring regions have different colors from each other. Also, JP-2006-350407A proposes a method for allocating colors by determining a photographic subject in a black and white picture. Further, application software that automatically performs colorization by referring to a color image having a pattern resembling a monochrome image to be colorized is in a practical use (Automatic Colorization Software "HighColor", URL: http://www.recursion.jp/mitou15).

SUMMARY OF THE INVENTION

It is preferable to selectively use different colorization methods according to attributes when colorization is performed on a document having a plurality of mixed regions with different types of the attributes such as a text region, a graphic region, and a photographic region. For example, text and graphics (charts, graphs, pictures, patterns, etc.) are subjected to colorization according to the densities, which is relatively simple to perform, and photographs (natural image) are subjected to colorization using an image recognition technique so that the resulting colorization does not cause strangeness.

However, as a result of using different types of colorization suited to individual attributes, there have been some cases where the resultant document becomes improper for visually reading information therefrom. Such improperness involves missing information, difficulty in legibility, and difficulty in viewing. For example, if the color of the text and the color around the text are identical, then the text information is lost. If such colors are close to each other, the text becomes difficult to read. If colors having low contrasts are assigned to neighboring regions, the regions are difficult to distinguish.

In view of the problems describe above, it is an object of the present invention to provide an apparatus, a method, and a computer-readable storage medium for computer program useful for colorizing a document including a plurality of regions with different attributes.

According to an aspect of the present invention, an image processing apparatus is provided for converting a monochrome image including a plurality of regions having individual attributes different from each other into a color image. The apparatus includes a selection portion that selects, for a plurality of attributes, individual colorization methods from among a plurality of colorization methods that are defined individually such that the plurality of colorization methods correspond to at least one attribute among the plurality of attributes relating to the plurality of regions, a processing portion that colorizes the monochrome image to produce a colorized image by applying the individual colorization methods selected by the selection portion, and a determination portion that determines whether or not the colorized image satisfies a setting condition. In this image processing apparatus, when the determination portion determines that the setting condition is not satisfied, the selection portion changes a combination of the colorization methods such that at least one among the plurality of colorization methods applied to the plurality of regions is changed. In addition, the processing portion performs re-colorization on a region having an attribute for which the selection of the colorization method is changed among colorization methods included in the combination.

These and other characteristics and objects of the present invention will become more apparent by the following descriptions of preferred embodiments with reference to drawings.

BRIEF DESCRIPTION OF THE DRAWINGS

FIG. 3 is a diagram illustrating combinations of colorization methods applicable to a plurality of attributes.

DESCRIPTION OF THE PREFERRED EMBODIMENTS

Figure 1:
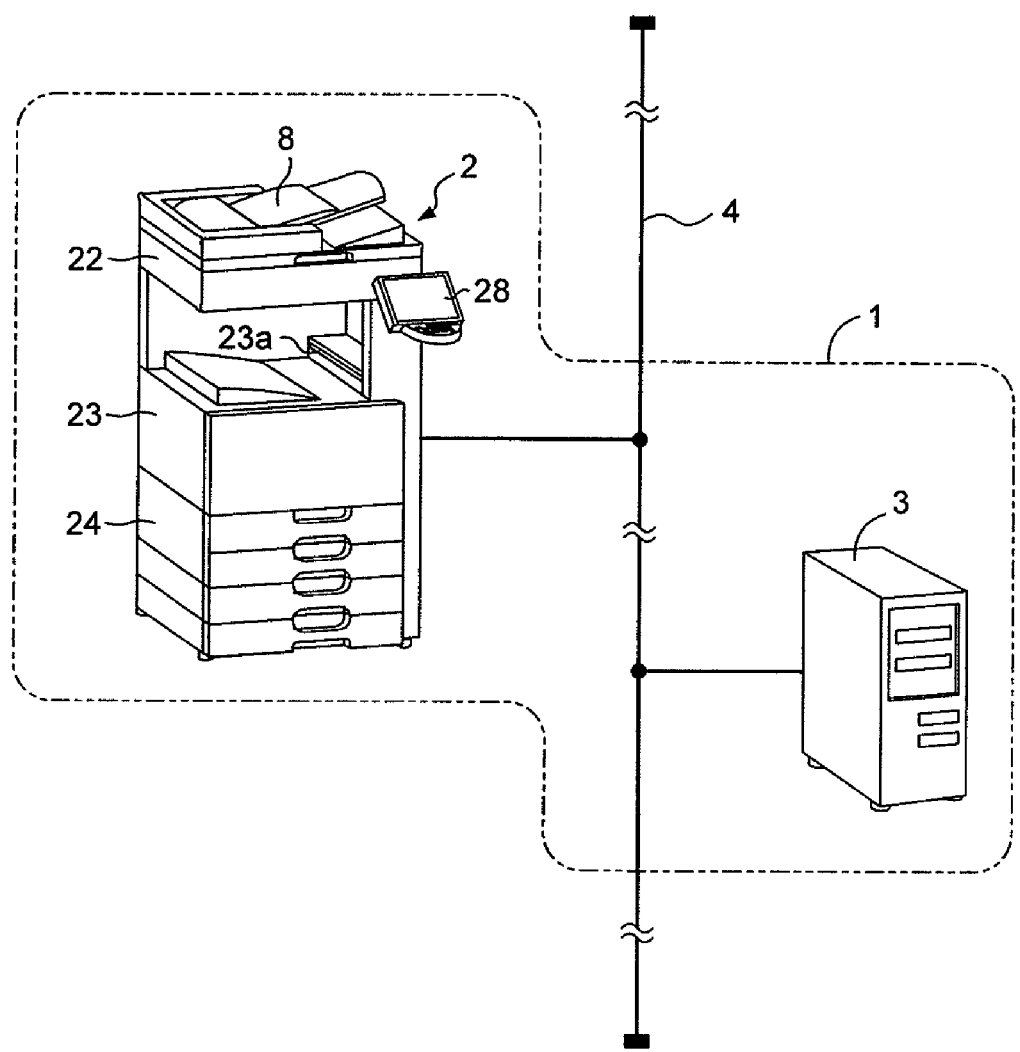
FIG. 1 is a diagram illustrating a hardware configuration of a color image generation system including an image processing apparatus according to an embodiment of the present invention.

The image processing for colorizing a monochrome image is performed, for example, by a color image generation system 1 illustrated in FIG. 1. The color image generation system 1 includes a multifunction apparatus 2, i.e., information equipment, called a Multifunction Peripheral (MFP), and an image processing apparatus 3 as a data processing server. The multifunction apparatus 2 and the image processing apparatus 3 are capable of accessing each other and exchanging data with each other via a network 4 that includes a wired or wireless communication line. As an embodiment, the system is configured of the multifunction apparatus 2 and the image processing apparatus 3 that are independent from each other as illustrated. However, without limiting to this configuration, it is also possible to configure the system so that the multifunction apparatus 2 incorporates therein the image processing function of the image processing apparatus 3.

The multifunction apparatus 2 is provided with an image scanner 22 serving as an image input device, a color printer 23 serving as an image output device, and a paper feed device 24. The image scanner 22 automatically feeds a document 8 placed by a user to an image reading position and optically reads, pigment by pigment, the image recorded on the document 8. The color printer 23 arranged below the image scanner 22 forms an image on paper fed from the paper feed device 24 by electrophotographic process when a job such as copying, network printing, or fax reception is performed. The paper on which the image is formed is ejected through a discharge slot 23a as a printout. The paper feed device 24 is equipped with a multistage paper deck and feeds a piece of paper, selectively, of a size specified by the job to the color printer 23.

According to the color image generating system 1, when a user specifies a copy job for colorizing a monochrome image through operation on an operation panel 28 of the multifunction device 2, monochrome image data read by the image scanner 22 is transmitted to the image processing device 3. Color image data corresponding to the monochrome image is generated by the image processing device 3 and fed into the multifunction device 2. Then, a color image is printed by the color printer 23. For the sake of description, it is assumed that the document 8 includes a monochrome image having a plurality of different attributes such as a text region, a graphic region, and a photograph region. However, a monochrome image having a single attribute such as a text document whose information is expressed only by letters can be colorized by the image processing apparatus 3. The monochrome image used in this description means a binary or multilevel image expressing the information by achromatic or chromatic densities and is not limited to a gray scale image resulted from converting a color image into a monochrome image.

Figure 2:
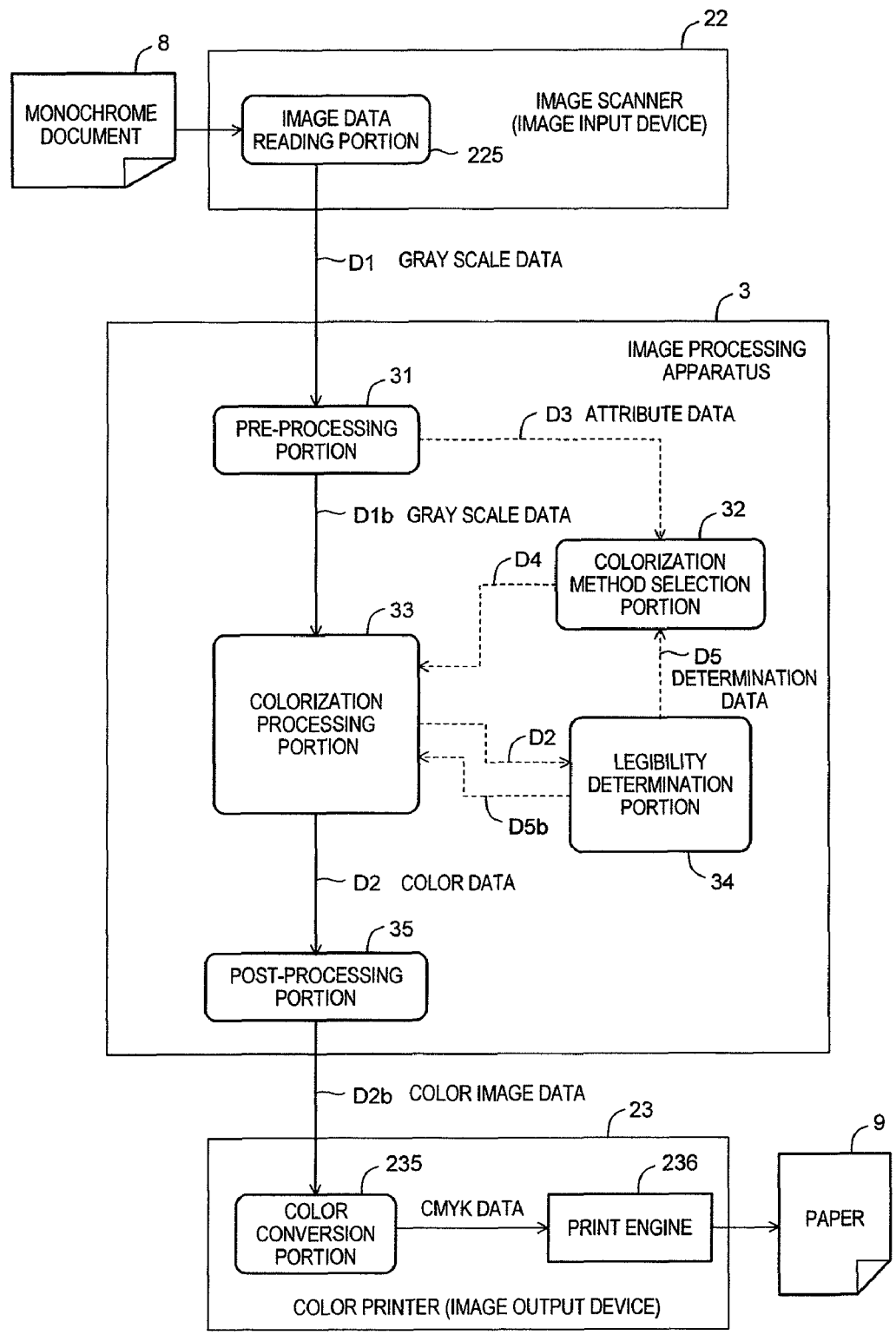
FIG. 2 is a diagram illustrating a functional configuration of the color image generation system.

As illustrated in FIG. 2, the image processing apparatus 3 receives gray scale data D1 from an image data reading portion 225 of the image scanner 22. The gray scale data D1 represents pixel values according to lightness of individual pixels of the monochrome image read from the document 8. The gray scale data D1 is converted into color image data D2b and transmitted to the color printer 23. The image processing apparatus 3 is provided with a pre-processing portion 31, a colorization method selection portion 32, a colorization processing portion 33, a legibility determination portion 34, and a post-processing portion 35. In this embodiment, these portions are implemented when an unillustrated computer executes programs.

The pre-processing portion 31 performs pre-processing including noise removal and determination of attribute for separating regions in the gray scale data D1. Then, the gray scale data D1d resulted from the processing by the pre-processing portion 31 is transmitted to the colorization processing portion 33. Also, attribute data D3 indicating a result of the determination of attribute is transmitted to the colorization method selection portion 32 from the pre-processing portion 31. Since it is a publicly known technique applied to a digital copier or scanner to determine the attribute of the information such as a text, a graphic, and a photograph included in an image and divide them into a plurality of regions, detailed description of how the attribute is determined is omitted.

The colorization method selection portion 32 selects, from among a plurality of colorization methods defined for each of the attributes, a single colorization method for each of the plurality of attributes indicated in the attribute data D3. In a predetermined correspondence relation between the attributes and the colorization methods, at least one attribute among the plurality of attributes is associated with a plurality of colorization methods as options to select from as described later. This means that it is possible to change combinations of selections for the plurality of attributes. When determination data D5 requesting a change of selection is fed in from the legibility determination portion 34, the colorization method selection portion 32 selects a colorization method other than the colorization method already selected for the attribute indicated in the determination data D5 to thereby change combinations of selections for a plurality of attributes. Then, selection data D4 indicating the result of the selection by the colorization method selection portion 32 is given to the colorization processing portion 33.

The colorization processing portion 33 performs colorization processing on the gray scale data D1b to thereby convert the gray scale data D1b into color data D2. In the colorization processing, the colorization processing portion 33 applies a colorization method corresponding to an attribute of a region indicated in the selection data D4 for each of the plurality of regions indicated in region separation information attached to the gray scale data D1b. With this arrangement, a plurality of colorization methods are applied to a single monochrome image. The color data D2 thus generated is temporarily transmitted to the legibility determination portion 34. When determination data D5b allowing an output of image is fed in from the legibility determination portion 34, the colorization processing portion 33 delivers the color data D2 to the post-processing portion 35. When the determination data D5b is not fed in but, instead, the selection data D4 indicating that the selection has been changed and details of the change is fed in from the colorization method selection portion 32, the colorization processing portion 33 performs colorization again on the region having the attribute for which the selection of the colorization method has been changed. The color data D2 thus obtained is transmitted to the legibility determination portion 34. The colorization is repeatedly performed until the determination data D5b is fed in.

The legibility determination portion 34 determines whether or not the color data D2 representing a colorized image satisfies a setting condition. The setting condition is a criterion for deciding whether the colorization is good or no good and is decided from a perspective of easiness in visual legibility. Since the color data D2 is generated by applying a plurality of colorization methods, it is possible that some portion thereof may result in a state difficult to read which otherwise would not be caused by colorizing an entire image through a single colorization method. For example, if pixels adjacent to each other and form a border of regions having different attributes are colorized in the same color, the border disappears partially. The setting condition corresponds to an upper limit of an allowable range that covers such a portion difficult to distinguish. The legibility determination portion 34 outputs the aforementioned determination data D5 or D5b in accordance with the result of the determination. When the color data D2 does not satisfy the setting condition, the determination data D5 is delivered to the colorization method selection portion 32, and, when the color data D2 satisfies the setting condition, the determination data D5b is delivered to the colorization method selection portion 32.

Thereafter, the post-processing portion 35 performs predetermined post-processing including smoothing for reducing color unevenness on the color data D2 inputted thereinto and transmits the color image data D2b thus obtained to the color printer 23. The color image data D2b expressed in RGB components is converted into CMYK data suitable for subtractive color mixture by a color conversion portion 235 of the color printer 23. Then, a print engine 236 prints the CMYK data onto paper 9 using color materials of cyan (C), magenta (M), yellow (Y), and black (B).

FIG. 3 illustrates combinations of the colorization methods that are applicable in the image processing apparatus 3. In this embodiment, six combinations are provided. In the combinations, each of the three attributes, namely, "text", "graphic", and "photograph", corresponds to each of the colorization methods. One of two methods A and B corresponds to the attribute of "text"; one of three methods A, B, and C corresponds to the attribute of "graphic"; and one method D corresponds to the attribute of "photograph". In the illustration, the methods corresponding to each of the combinations are indicated with "YES".

The methods A and B are the methods in that individual colors are assigned to individual density (lightness) values, and a color corresponding to a density value of a pixel of an original image is assigned to a pixel of the color image. Black is assigned to the largest density value, white is assigned to the smallest density value, and chromatic colors having predetermined lightness values are assigned to other density values individually, so that a degree of darkness of the original image is reflected in the color image. The difference between the methods A and B is that a color corresponding to an intermediate density value in the density range is a red based color in the method A, whereas it is a green based color in the method B. To put it differently, a change in hue in order of black, blue, red, yellow, and white corresponds to a change of density from the largest value to the smallest value according to the method A, whereas a change in hue in order of black, blue, green, and yellow, white corresponds to the same according to the method B.

The method C is a method in that a color different from an adjacent portion is assigned to each portion differentiated by the density values. In general, the number of colors that can be assigned is three or more, and the colors that can be assigned are evenly used to prevent the distribution of colors from becoming extremely uneven.

The method D applied to a photograph region is a method in that a plurality of sample images are prepared, a color image having details similar to those of an image of a photograph region is searched for, and the region is colorized to the semblance of the color arrangement of the color image extracted as a result of the search. According to the method D, the subject can be colorized in a natural color close to its original color. There is also a method other than the method D to identify the subject by the image recognition technique and select colors from color samples of different types of articles. It is also possible to use this method as an alternative of the method D or as a method together with the method D to deal with a photograph.

Since there are provided a plurality of combinations applicable to colorization, it is highly possible to obtain an excellent color image in terms of legibility as compared with a case of a single combination. It is also possible to generate a plurality of color images by applying all of the combinations and select the finest color image from among the results thus generated as an output image.

Referring to a flowchart, the operation of the image processing apparatus 3 will be described.

Figure 4:
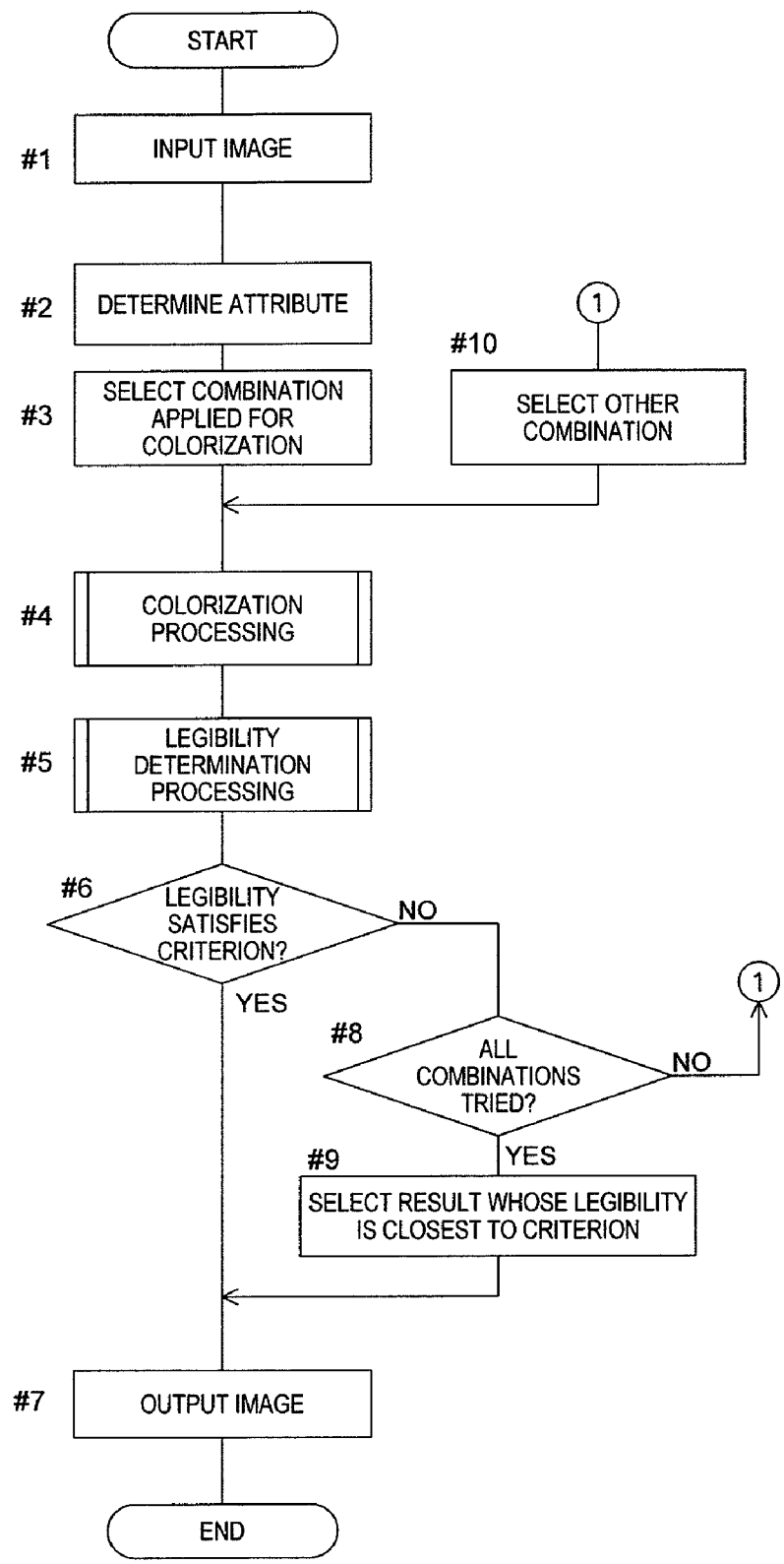
FIG. 4 is a flowchart illustrating outline operation of the image processing apparatus.

As illustrated in FIG. 4, the image processing apparatus 3 receives an input of a monochrome image from the multifunction apparatus 2 (#1). The pre-processing portion 31 determines the attribute and thereby finds types of attributes of the regions that form the monochrome image (#2). The colorization method selection portion 32 selects a combination to be applied to colorization (#3). In this operation, if it is a first selection, then, for example, the first combination illustrated in FIG. 3 is selected. The colorization processing portion 33 applies the methods included in the combination thus selected and performs colorization processing for converting the gray scale data D1b into the color data D2 (#4).

Figure 5:
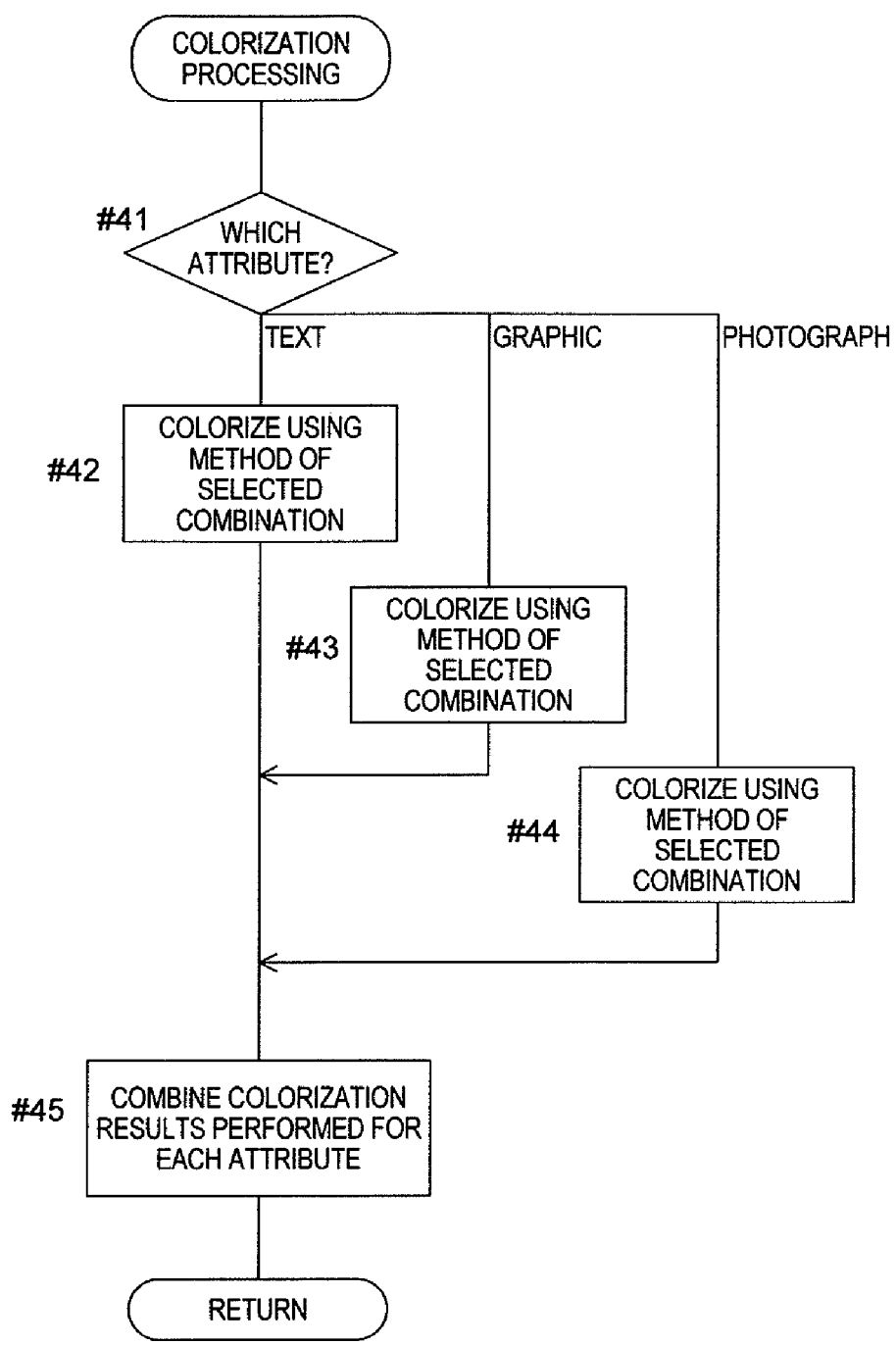
FIG. 5 is a flowchart illustrating a colorization process performed by the image processing apparatus.

FIG. 5 illustrates details of a colorization processing routine. As illustrated in FIG. 5, each of the plurality of regions having different attributes included in the monochrome image is subjected to the colorization processing by applying a colorization method of the selected combination corresponding to the attribute of the region. In this way, colorization is performed for each attribute (#41-#44), and the plurality of regions thus colorized are integrated into a single image (#45).

Referring back to FIG. 4, the legibility determination portion 34 performs legibility determination processing to determine the result of the colorization processing (#5). If the criterion for legibility is satisfied, i.e., if it is determined that the color data D2 satisfies the setting condition, the image processing apparatus 3 feeds out, to the multifunction apparatus 2, color image data D2b resulted from performing the post-processing on the color data D2 (#6 and #7).

In the legibility determination processing, on the other hand, if the legibility determination portion 34 determines that the result "does not satisfy the criterion for legibility", the legibility determination portion 34 subsequently checks if it is possible to change the combination of the methods (#8). If all of the combinations have been applied and it is not possible to change the combinations, then the legibility determination portion 34 selects, as an image to be outputted, an image that is closest to the criterion from among a plurality of pieces of color data D2 resulted from individually application of all the combinations (#8). In contrast, if there are some combinations that have not been applied, the colorization method selection portion 32 changes the combination (#8 and #10).

When the combination is changed, the colorization processing (#4) and the legibility determination processing (#5) are repeated.

Figure 6:
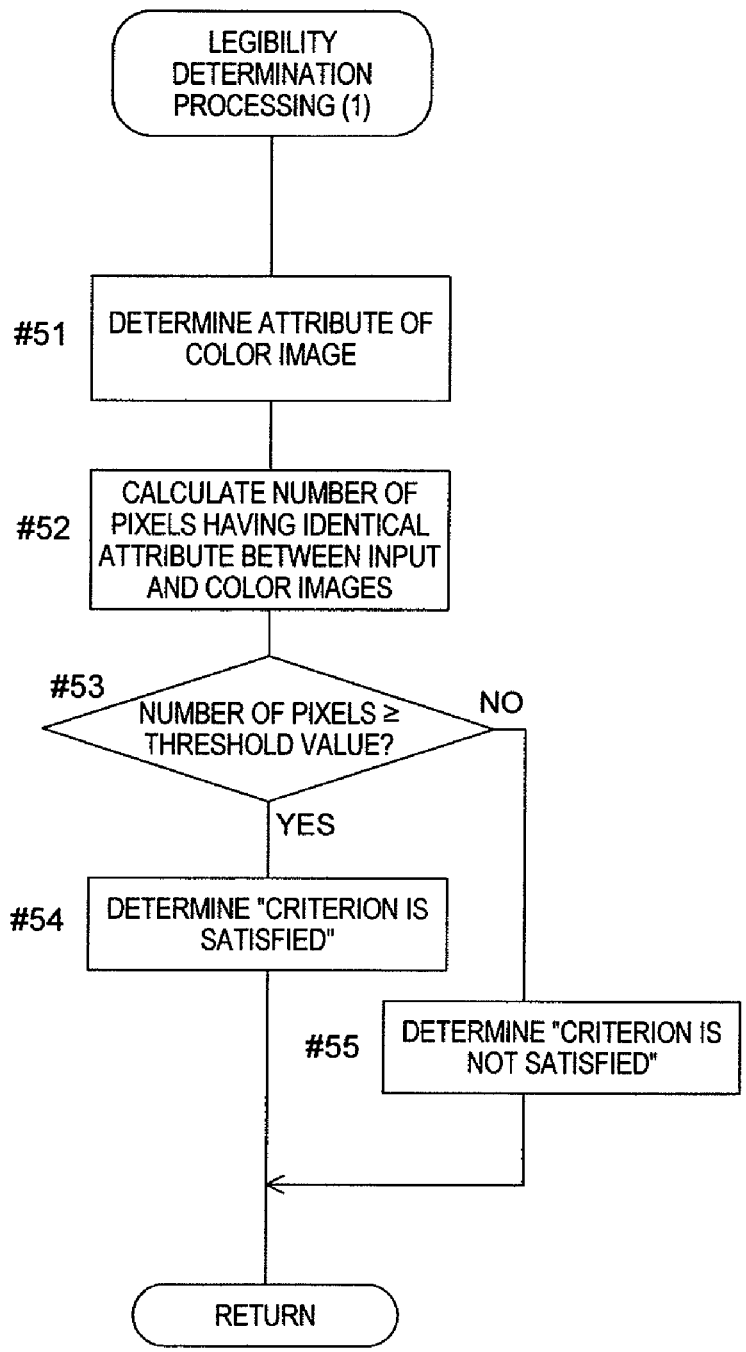
FIG. 6 is a flowchart of a first example of a legibility determination process performed by the image processing apparatus.

FIG. 6 illustrates a first example of the legibility determination processing. In the first example, a degree of agreement of the attribute between before and after colorization is set as a setting condition, which means that a weight is placed on the prevention of missing information. First, the legibility determination portion 35 determines the attribute of each pixel of an image colorized by the colorization processing portion 31 (#51). The legibility determination portion 35 subsequently compares a result of the determination of the attribute of the colorized image with the result of the determination of the attribute performed by the pre-processing portion 31 on the input image before colorization (#52). In the comparison, the legibility determination portion 35 finds the number of pixels whose attributes agree with each other. Then, the legibility determination portion 35 determines that "criterion is satisfied" when the number of agreed pixels is equal to or larger than a threshold value corresponding to a total number of pixels that is decided by the resolution of the image (#53 and #54), but the legibility determination portion 35 determines that "criterion is not satisfied" when the number of agreed pixels is smaller than the threshold value (#53 and #55).

The threshold value may be set at a value corresponding to 85-95% of the total number of pixels, for example. However, it should be noted that, without limiting to this value, it is preferable to appropriately optimize the value by taking the accuracy of the determination of the attribute into account. The greater the threshold value is set, the higher the quality of the color image fed out from the image processing apparatus 3 becomes.

Figure 7:
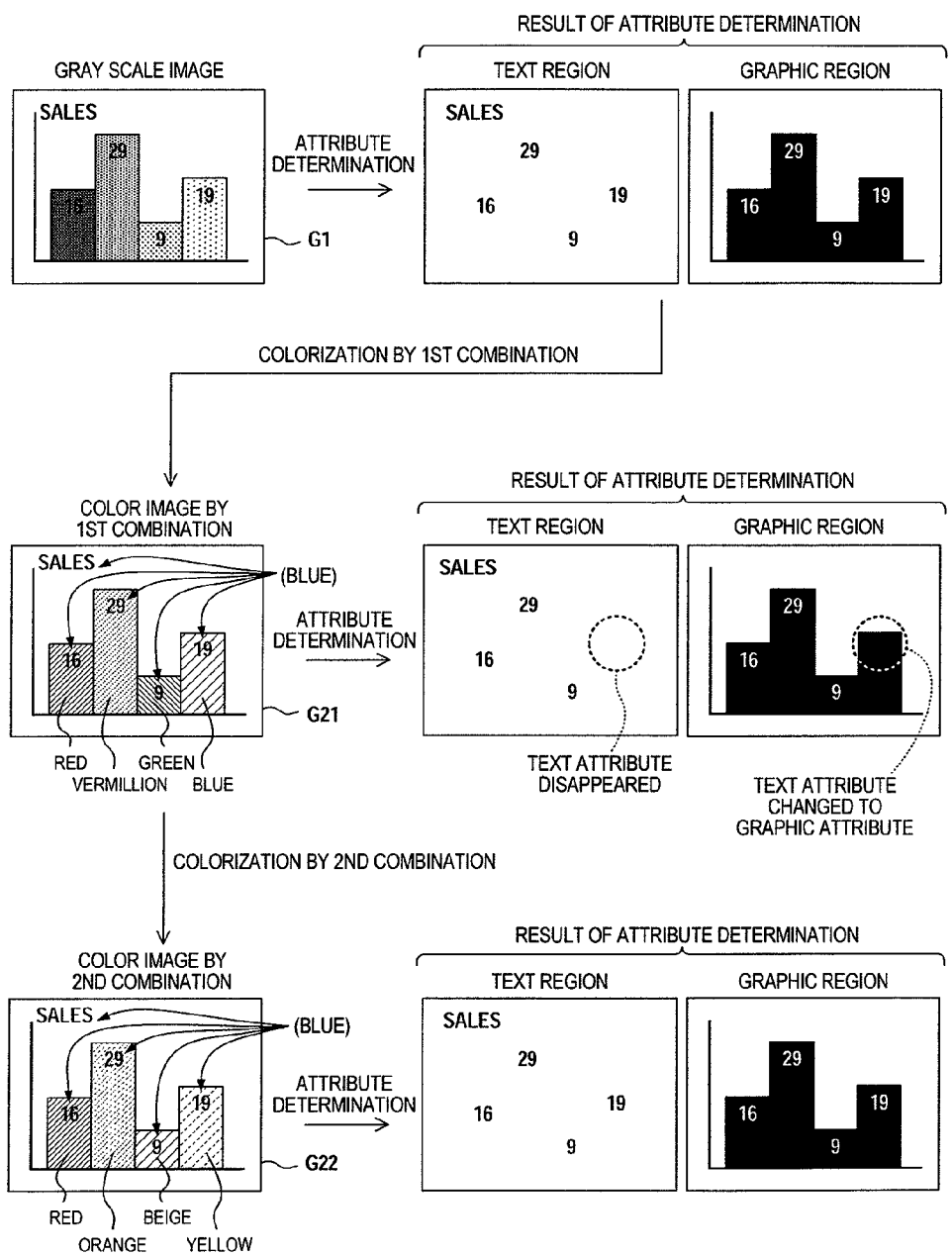
FIG. 7 is a diagram illustrating an example of colorizing an image including a text region and a graphic region mixed together.

FIG. 7 illustrates one example of a process of re-colorization by changing the combination of the methods to be applied. The left portion of FIG. 7 depicts, from top to bottom, a gray scale image G1 to be colorized, a color image G21 colorized based on the gray scale image G1 by the first combination method, and a color image G22 colorized based on the gray scale image G1 by the second combination method. On the right side of these images G1, G21, and G22, the results of the attribute determination are schematically illustrated in a corresponding manner. In the illustration depicting the results of the attribute determination, black portions indicate the portions that belong to the determined attributes.

The gray scale image G1 as exemplified indicates a bar chart. As the result of the attribute determination indicates, the gray scale image G1 has a text region and a graphic region. The text region includes a character string "SALES" indicating an index of a vertical axis of the chart, and four numeric values of "16", "29", "9", and "19" respectively corresponding to the lengths of four bars. The graphic region includes the vertical axis, the horizontal axis, and the four bars. Since the four numeric values overlap their respective bars in the example, the graphic region is formed of a region excluding the numeric values placed on the bars. This is expressed in a form of solid white characters in FIG. 7.

The first combination method applied to the colorization includes a method A for the text and a method C for the graphic, as illustrated in FIG. 3. In the color image G21 resulted from the application of the first combination method, the color of the text region entirely becomes blue, the four bars belonging to the graphic region are colored in red, vermillion, green, and blue respectively from the left. This means that a part of the graphic region has blue which is the same color as the text region. The same color used in this context includes such a color that is so close to a color to be compared and substantially can not be distinguished therefrom.

The result of the attribute determination on the color image G21 shows a different portion as compared with the result of the attribute determination on the gray scale image G1. In FIG. 7, the different portion is circled with a broke line. When the text region is taken, one of the four numeric values, i.e., "19", is not included in the text region. When the graphic region is taken, the numeric value "19" is included in the graphic region. This means that the attributes of pixels corresponding to the numeric value "19" are incorrectly determined, which, as a result, causes a lack of information corresponding to the numeric value "19". The reason why the attributes are incorrectly determined is that the numeric value "19" and the graphic region in the vicinity thereof are colorized by the same color.

In order to obtain a proper color image, the combinations of the methods for applying colorization are changed. Since the first combination before the change caused a problem with the text and the graphic, it will be meaningless to repeat the process unless the methods are changed for the text and the graphic among three attributes, i.e., text, graphic, and photograph. All of the second to sixth combinations illustrated in FIG. 3 are different from the first combination with respect to the method for the text or the graphic, and therefore can be candidates to be chosen from for the change of the method. In the example illustrated in FIG. 7, the first combination is changed to the second combination. In the second combination, the method A is applied to both the text and the graphic.

In the color image G22 resulted from applying the second combination, the color in the text region is entirely blue, which is same as in the case of the color image G21, but the colors of the four bars belonging to the graphic region is red, orange, beige, and yellow from the left, respectively. This means that any of the portions in the graphic region is colorized in colors different from the color in the text region. Accordingly, the result of the attribute determination on the color image G22 is similar to the result of the attribute determination on the gray scale image G1. It can be concluded that there is no lack of information in the color image G22.

Figure 8:
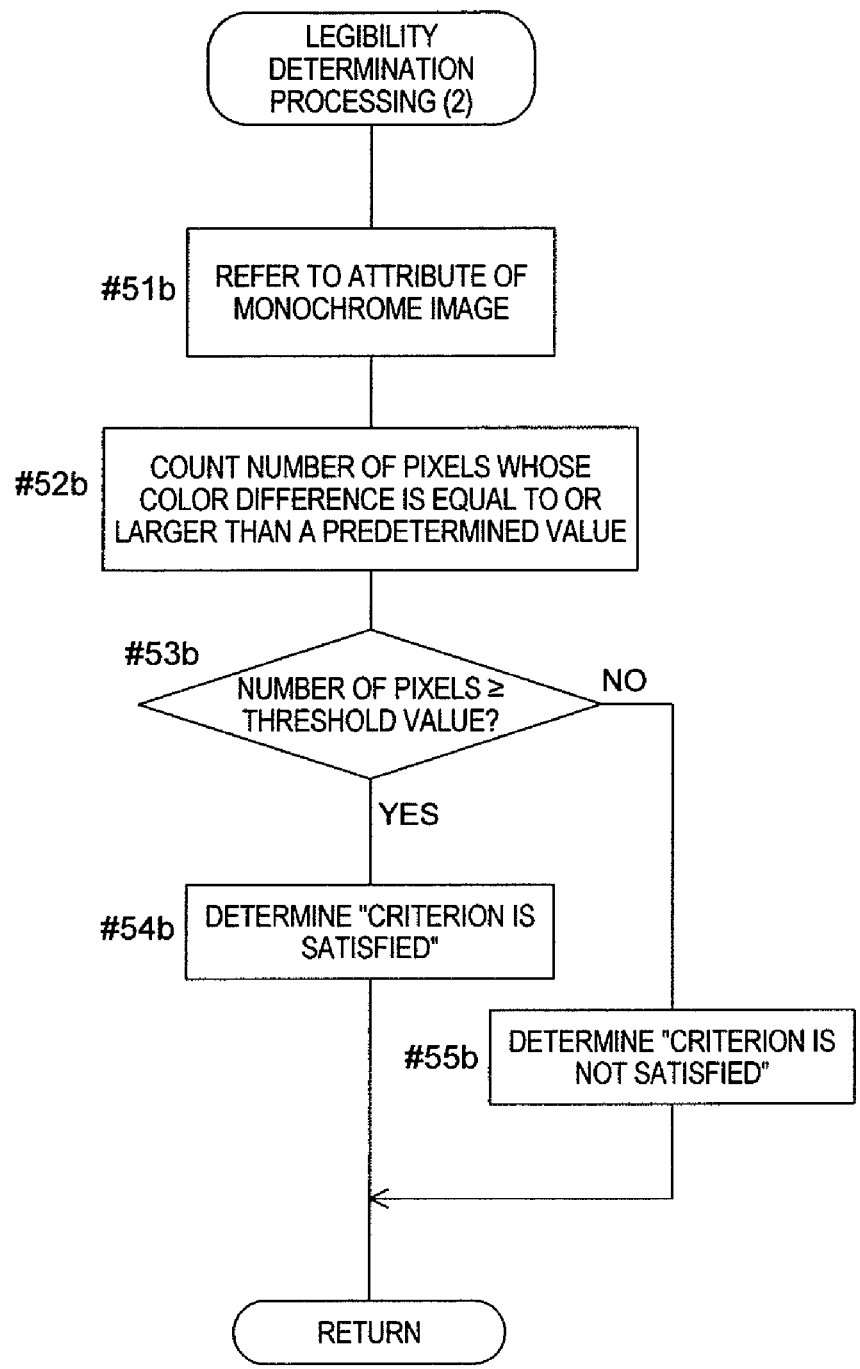
FIG. 8 is a flowchart of a second example of a legibility determination process.

FIG. 8 illustrates a second example of the legibility determination processing. In the second example, a ratio of a distinguishable portion on a border of regions after colorization is set as a setting condition, which means that a weight is placed on the prevention of missing information and on the clarity of information as well. The border of regions means a border between the regions whose attributes are different from each other. The distinguishable portion means a portion having a distinguishable color from that of the adjacent region. The difference in color can be numerically expressed as a color difference, for example, in L*a*b* color space. A color difference having a value larger than a predetermined value can be regarded as a noticeable color difference.

First, the legibility determination portion 35 refers to the attribute of the monochrome image which has been determined by the pre-processing portion 31 (#51b). The legibility determination portion 35, subsequently, determines a color difference between adjacent pixels of a border of regions (to be exact, this is a portion corresponding to the border of regions in the monochrome image) in the colorized image, and counts the number of pixels whose difference in color from adjacent pixels is equal to or larger than a predetermined value (#52b). Then, the legibility determination portion 35 determines that "the criterion is satisfied" when the counted number of pixels is equal to or larger than a threshold value that is determined by a percentage of the total number of pixels in the border of regions (#53b and #54b), but determines that "the criterion is not satisfied" when the counted number of pixels is smaller than the threshold value (#53b and #55b).

For example, the threshold value may be set at a value corresponding to 70-80% of the total number of pixels of the border of regions. However, it should be noted that, without limiting to this value, it is preferable to appropriately optimize the threshold value along with the criterion for determining the color difference. The smaller the threshold value becomes within a range causing substantially no difficulty in reading information from the color image, the easier it becomes to obtain the determination of "the criterion is satisfied".

For example, it is possible to extract a pixel for determining the color difference. In other words, without using all the pixels corresponding to the border of regions, it is possible to make determination by selecting one pixel from a pixel block having a size of N×N pixels. The value of N may be calculated according to the size of the region relating to the border. For example, if a region of interest is inscribed in a rectangle having a size of 50×50 pixels, each side of the rectangle is divided into M to thereby arrange a pixel block as an extracted unit. The N of this pixel block is the result from 50/M. It is also possible to determine the color difference only on a border of regions relating to the text attribute so that the priority is placed on the prevention of the legibility of text from being lowered. Calculation of the color difference is performed based not only on the colors of adjacent pixels but also on the average value or the median value of colors of neighboring pixels having an identical attribute.

Figure 9A:
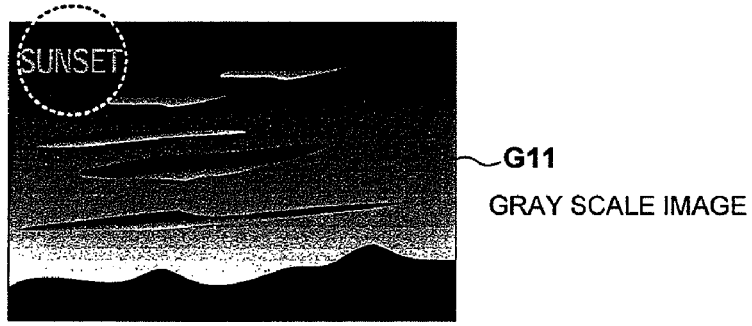
FIGS. 9A to 9C illustrate colorization examples of an image including a text region and a graphic region mixed together.
Figure 9B:
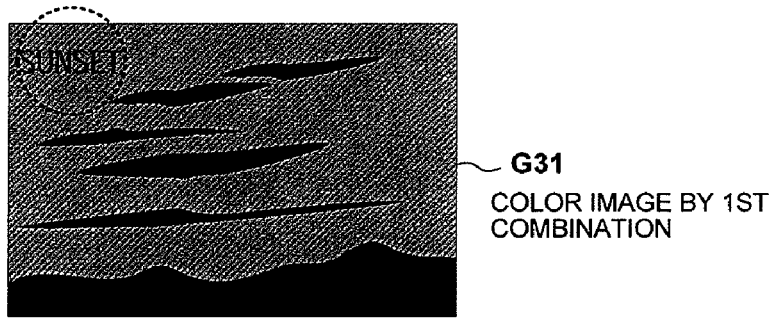
Figure 9C:
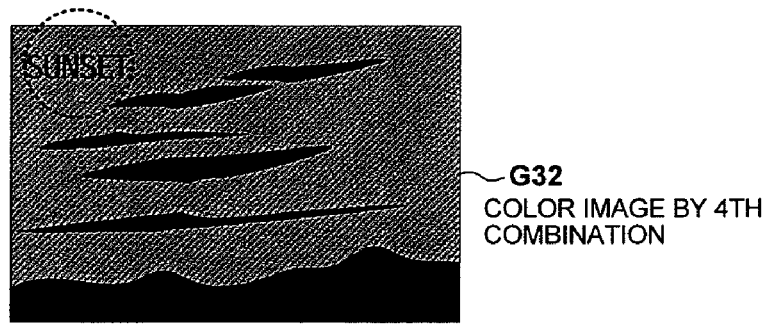

FIGS. 9A to 9C illustrate examples of colorization of an image having text and photograph regions mixed with each other. A gray scale image G11 illustrated in FIG. 9A is an original image to be colorized in this example. FIG. 9B illustrates a color image G31 resulted from colorizing the gray scale image G11 by the first combination. FIG. 9C illustrates a color image G32 resulted from colorizing the gray scale image G11 by the fourth combination.

The gray scale image G11 is a photograph including a sunset sky photographed together with mountains in the distance. However, a character string "SUNSET" representing the title of the photograph is combined in the left upper portion of the gray scale image G11, and therefore the gray scale image G11 includes the photograph region and the text region. The character string "SUNSET" corresponds to the text region and areas other than the character string "SUNSET" correspond to the photograph region. Circles drawn with a broken line in the illustrations indicate positions of the character string "SUNSET". In the gray scale image G11, the character string "SUNSET" is positioned in the sky portion of the photograph, and the density value of pixels corresponding to the character string "SUNSET" is approximately a value in the middle of the density range.

The method D is applied to the photograph region when the gray scale image G11 is colorized (refer to FIG. 3). Here, it is assumed that colorization in natural color is performed on the photograph region of the gray scale image G11 by the method D. Specifically, it is assumed that the sky is colorized by a red based color while actually photographed images including sunset or sunrise similar to the gray scale image G11 are referred to.

On the other hand, the method A or the method B can be applied to the text region. According to the method A, a red based color is assigned to a pixel having a medium density as discussed above. For this reason, in the color image G31 illustrated in FIG. 9B to which the method A is applied, the color of the sky and the color of the character string "SUN-SET" are similar colors. The character string "SUNSET" in the color image G31 is not conspicuous and is difficult to identify. In contrast, according to the method B, a green based color is assigned to a pixel having a medium density. In the color image G32 illustrated in FIG. 9C to which the method B is applied, a difference in colors of the sky and the character string "SUNSET" is conspicuous. The character string "SUNSET" in the color image G32 is relatively conspicuous and easy to identify. This means that, in the colorization of the gray scale image G11 as exemplified in FIG. 9A, the fourth combination including the method B and the method D is suitable than the first combination method including the method A and the method D among the first to sixth combinations illustrated in FIG. 3.

When the first to sixth combinations illustrated in FIG. 3 are changed, it is possible to omit such combinations by which the legibility determination results remain unchanged. For example, in the colorization of the gray scale image G11 illustrated in FIG. 9A, when the first combination is selected, and thereafter the combination is changed from the first combination to another combination because the result does not satisfy the criterion in the legibility determination, the second and third combinations may be excluded from further options to select from. The reason is that, since the second and third combinations use the methods A and D as in the case of the first combination for the text and the photograph, it is presumed that the result of legibility determination remains unchanged even if the second and third combinations are used. However, for the colorization of an image including three attributes of text, graphic, and photograph, all of unselected combinations among the first to sixth combinations may be kept as further options to select from, because the result of the legibility determination may change if the selection of the first to sixth combinations is changed.

Figure 10:
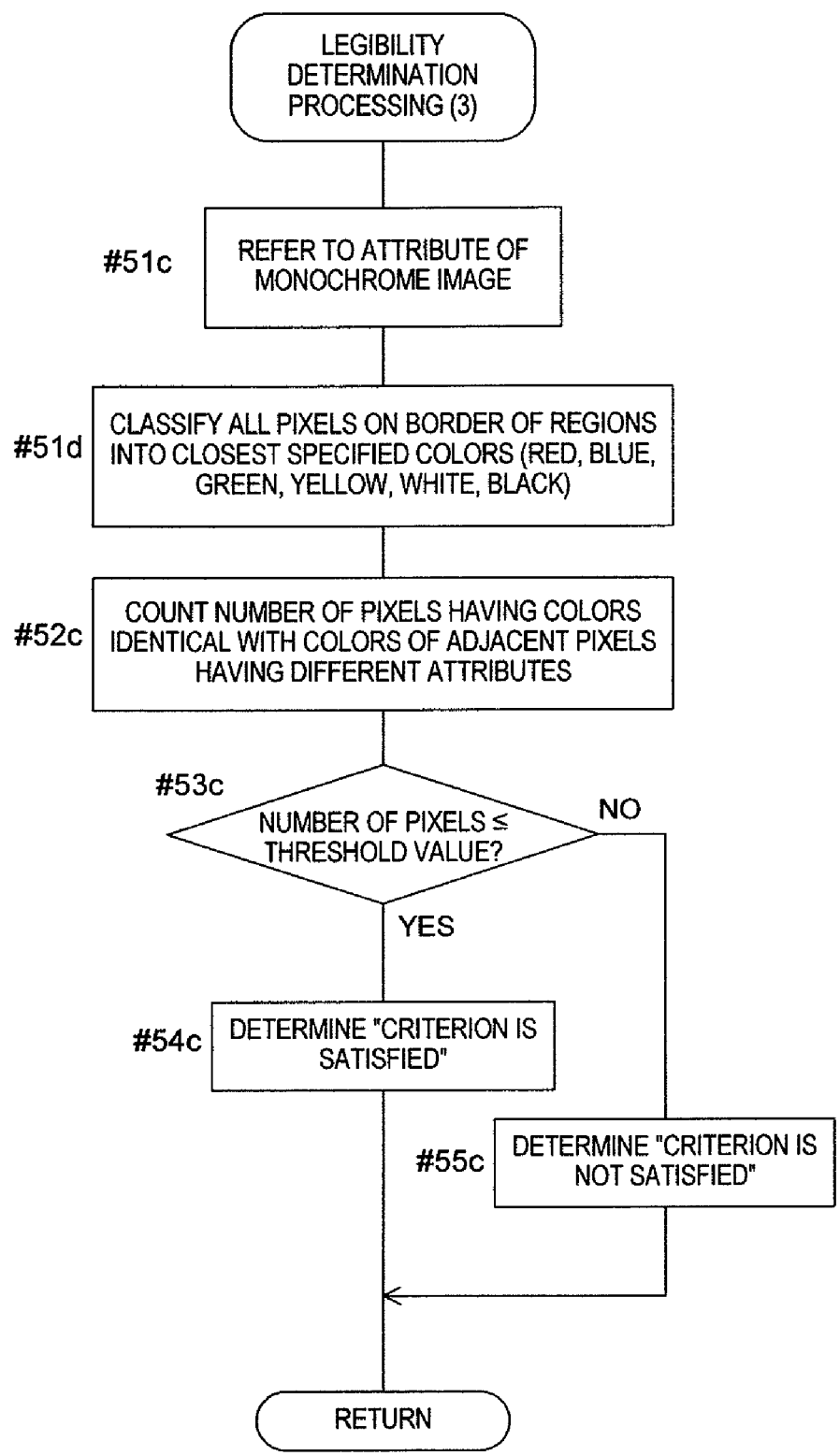
FIG. 10 is a flowchart of a third example of a legibility determination process.

FIG. 10 illustrates a third example of the legibility determination processing depicted in FIG. 4. In the third example, a ratio in which the borders of regions after colorization are colorized by similar colors is set as a setting condition. With this arrangement, it is possible to prevent the border from becoming difficult to distinguish because contrast of colors is lowered and adjacent regions have colors in the same color family as a result of similar colors being continuously placed. It is possible to determine whether colors belong to the same color family or not by classifying the colors of pixels into some representative colors (specified colors). The colors having hues by which the colors are classified into the same specified color are deemed to belong to the same color family.

First, the legibility determination portion 35 refers to the attributes of the monochrome image determined by the pre-processing portion 31 (#51c). Next, the legibility determination portion 35 classifies the colors of the pixels of the border of regions in the colorized image, i.e., portions corresponding to the border of regions in the monochrome image, into a closest color among the preset specified colors of red, blue, green, yellow, white, and black (#51d). The classification method adopted here may be a method in which a distance in a color space, a difference in hue, or a difference in lightness between the specified color and the color of the pixel is calculated, or a method in which a classification table prepared in advance is looked up. The legibility determination portion 35, subsequently, counts the number of pixels of the border of regions whose classified color is the same as the adjacent pixel (#52c). Then, the legibility determination portion 35 determines that "the criterion is satisfied" when the counted number of pixels is equal to or less than a threshold value that is determined by a predetermined percentage to the total number of pixels on the border of regions (#53c and

54c), but determines that "the criterion is not satisfied" when the number of the counted pixels is greater than the threshold value (#53c and #55c).

As the threshold value, a value corresponding to 20-30% of the total number of pixels of the border of regions can be chosen. Actually, without limiting to this example, it is preferable to appropriately optimize this figure as specifications.

Although the text, graphic, and photograph are specified as the attributes in the embodiment described above, the embodiment is not limited to this. For example, four attributes may be used by adding thereto a background. Among the methods for colorizing the background region are the methods A and B, a method similar thereto, and a method in which default colors or user specified colors are used for colorization.

In the embodiment described above, it is also possible to perform colorization using all of the combinations, i.e., the first to sixth combinations, compare individual results with one another, and output the finest color image, instead of determining whether the colorization result satisfies the setting condition or not.

The legibility based on human perception relates not only to the colors but also to the subtleness of characters or patterns. Accordingly, it is possible to calculate a spatial frequency of an image and analyze the image in the high-frequency region to thereby set, as a determination criterion for the legibility, a condition including the subtleness of characters and patterns as well. Determination closely based on the human perception is made possible by using the combination of the determination criterion of subtleness with the determination criterion of colors.

It is also possible to perform optical character recognition (OCR) on the monochrome image and the image colorized therefrom, and establish the setting condition for the legibility determination based on how the extracted characters from these two images are identical with each other (or whether the number of identical characters is equal to or smaller than a threshold).

According to the embodiment, it is possible to colorize a monochrome image that includes a plurality of regions having different attributes by applying, region by region, individual methods suitable for the region to be processed, and obtain a color image satisfying a setting condition.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus for converting a monochrome image into a color image, the apparatus comprising:
an attribute determination portion that determines an attribute of a pixel to be any of three attributes of a text, a graphic, and a photograph, and divides a region in accordance with the attribute of each pixel;
a selection portion that selects, for each of the attributes, one colorization method from among a plurality of predetermined colorization methods;
a processing portion that colorizes the monochrome image by applying the colorization method selected by the selection portion; and
a determination portion that determines whether or not a change of selection of the colorization method is necessary based on an attribute of each pixel of the monochrome image and an attribute of each pixel of a colorized image by the processing portion, or, alternatively, based on a color of a pixel adjacent to a border between regions that is a border between the regions whose attributes are different from each other;
wherein, when the determination portion determines that the change of selection is necessary, the selection portion changes selection of the colorization method for at least one attribute such that a combination of the colorization method applied to the monochrome image and the attribute is changed, and
the processing portion performs re-colorization on a region having an attribute for which the selection of the colorization method is changed by the selection portion.

2. The image processing apparatus according to claim 1, wherein the determination by the determination portion, the change of selection by the selection portion, and the re-colorization by the processing portion are repeated until the determination portion determines that the change of selection is unnecessary or the combination of the colorization method applied to the monochrome image and the attribute can not be changed any more.

3. The image processing apparatus according to claim 1, wherein the determination portion makes an identification of the attribute of each pixel of the colorized image, and determines that the change of selection is necessary if the number of pixels whose attributes agree with each other between the colorized image and the monochrome image is smaller than a threshold value.

4. The image processing apparatus according to claim 1, wherein the determination portion determines a color difference between adjacent pixels of a border between the regions in the colorized image, and determines that the change of selection is necessary if a rate of pixels having a color difference equal to or larger than a predetermined value between the adjacent pixels of the border between the regions is smaller than a threshold value.

5. The image processing apparatus according to claim 1, wherein the determination portion performs classification of a color of a pixel of a border between the regions in the colorized image, and determines that the change of a selection is necessary if a rate of pixels whose color is classified and identical with a color of an adjacent pixel is larger than a threshold value.

6. A non-transitory computer-readable storage medium storing thereon a computer program for a computer provided in an image processing apparatus that converts a monochrome image into a color image, the computer program, when executed by the computer, causing the computer to implement:
an attribute determination portion that determines an attribute of a pixel to be any of three attributes of a text, a graphic, and a photograph, and divides a region in accordance with the attribute of each pixel;
a selection portion that selects, for each of the attributes, one colorization method from among a plurality of predetermined colorization methods;
a processing portion that colorizes the monochrome image by applying the colorization method selected by the selection portion; and
a determination portion that determines whether or not a change of selection of the colorization method is necessary based on an attribute of each pixel of the monochrome image and an attribute of each pixel of a colorized image by the processing portion, or, alternatively, based on a color of a pixel adjacent to a border between regions that is a border between the regions whose attributes are different from each other;

wherein, when the determination portion determines that the change of selection is necessary, the selection portion changes selection of the colorization method for at least one attribute such that a combination of the colorization method applied to the monochrome image and the attribute is changed, and the processing portion performs re-colorization on a region having an attribute for which the selection of the colorization method is changed by the selection portion.

7. The non-transitory computer-readable storage medium according to claim 6,
wherein the determination by the determination portion, the change of selection by the selection portion, and the re-colorization by the processing portion are repeated until the determination portion determines that the change of selection is unnecessary or the combination of the colorization method applied to the monochrome image and the attribute can not be changed any more.

8. The non-transitory computer-readable storage medium according to claim 6,
wherein the determination portion makes an identification of the attribute of each color pixel of the colorized image, and determines that the change of selection is necessary if the number of pixels whose attributes agree with each other between the colorized image and the monochrome image is smaller than a threshold value.

9. The non-transitory computer-readable storage medium according to claim 6,
wherein the determination portion determines a color difference between adjacent pixels of the border between the regions in the colorized image, and determines that the change of selection is necessary if a rate of pixels having a color difference equal to or larger than a predetermined value between the adjacent pixels of the border between the regions is smaller than a threshold value.

10. The non-transitory computer-readable storage medium according to claim 6,
wherein the determination portion performs classification of a color of a pixel of the border between the regions in the colorized image, and determines that the change of selection is necessary if a rate of pixels whose color is classified and identical with a color of an adjacent pixel is larger than a threshold value.

* * * * *